May 25, 1948.          R. P. DUNMIRE          2,442,234
PROCESS OF AND APPARATUS FOR FILTERING MATERIALS
Filed May 11, 1944          4 Sheets-Sheet 1
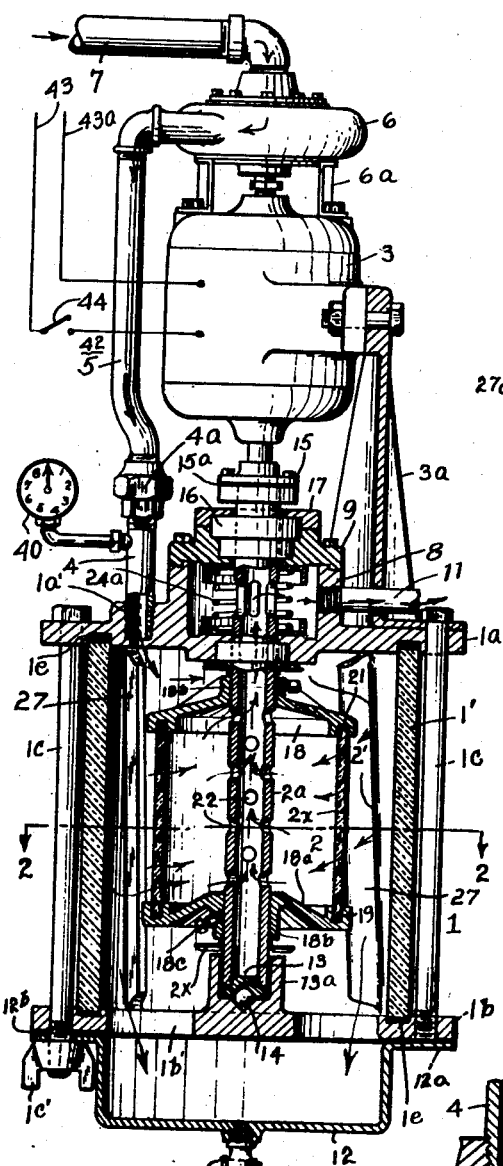
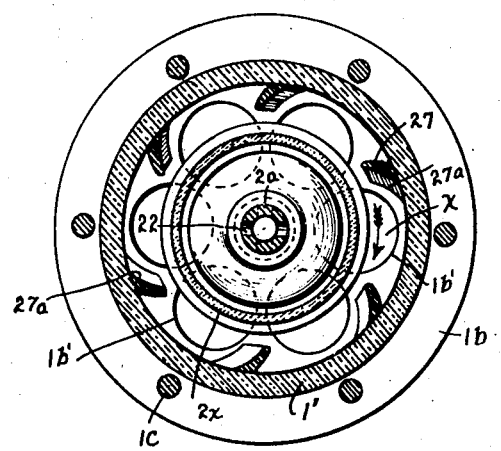
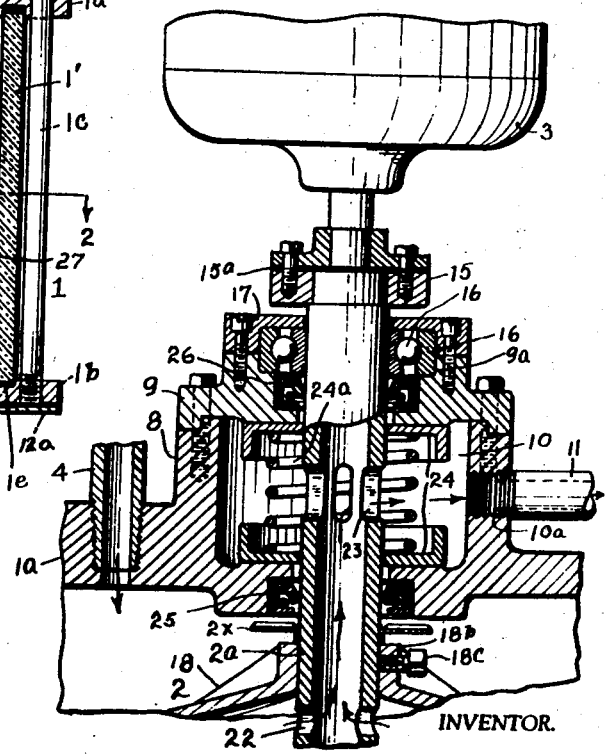
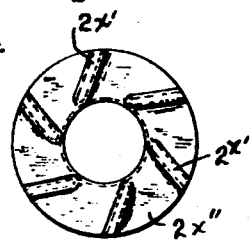
INVENTOR.
RUSSELL P. DUNMIRE.

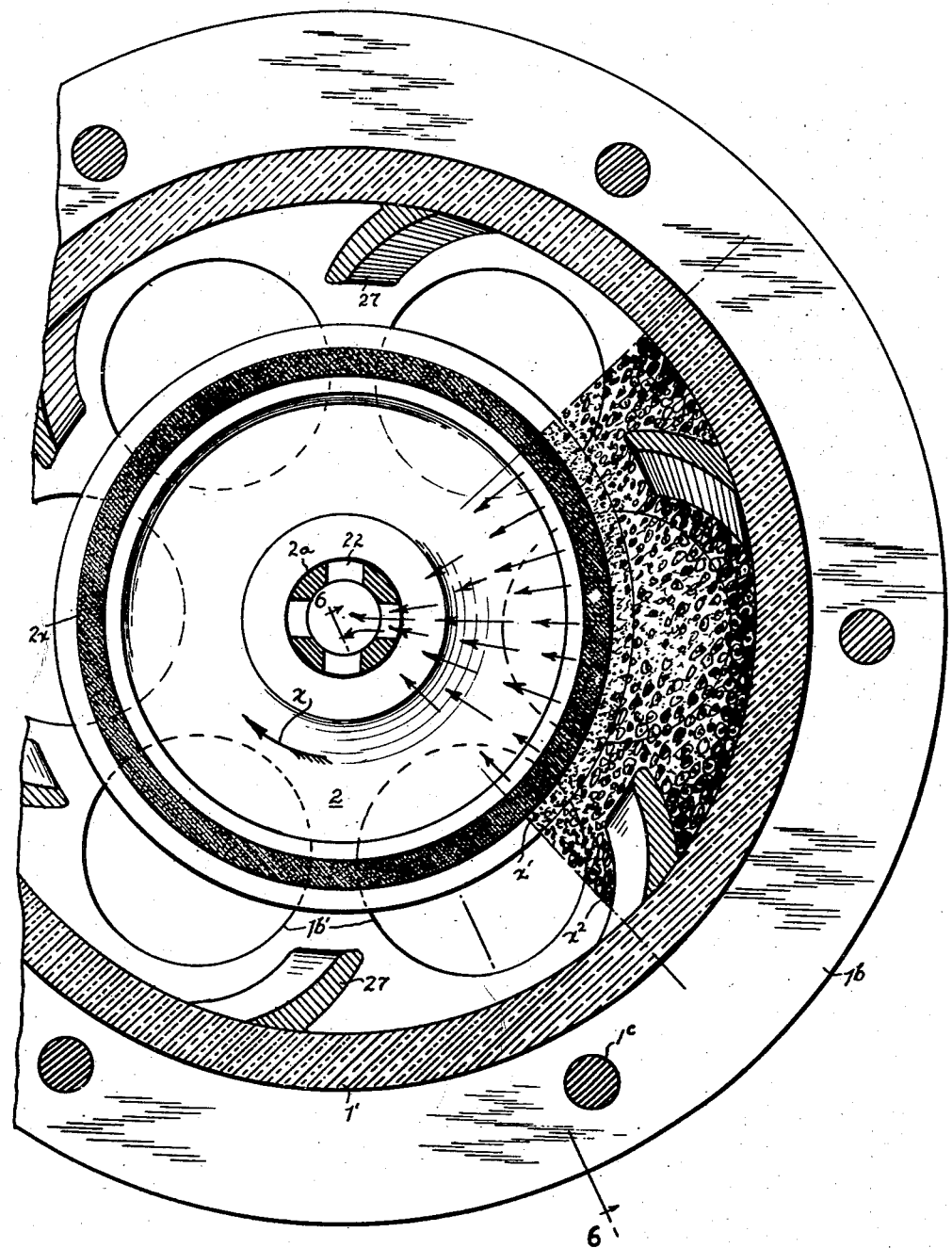

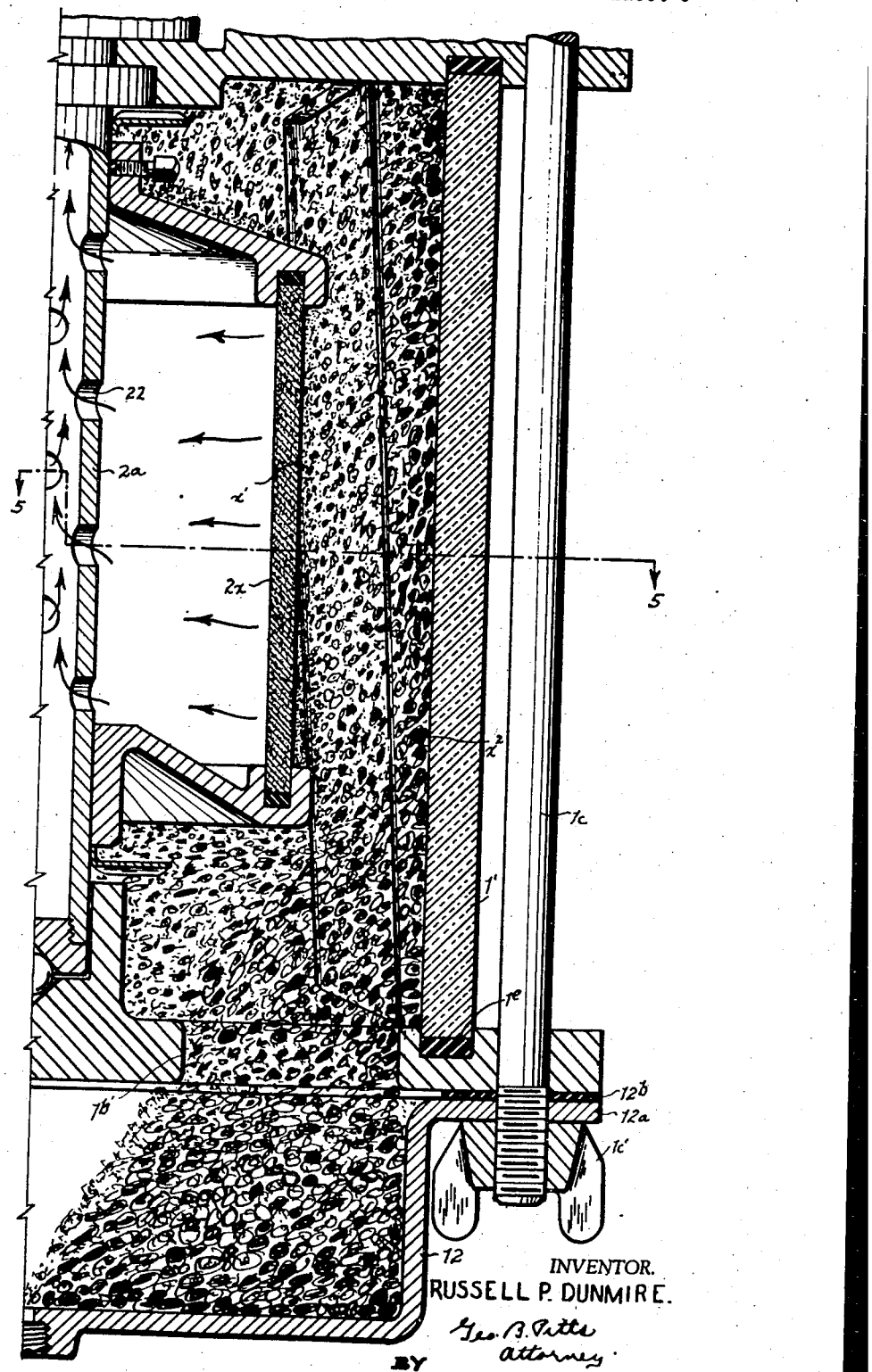

May 25, 1948.
R. P. DUNMIRE
2,442,234
PROCESS OF AND APPARATUS FOR FILTERING MATERIALS
Filed May 11, 1944
4 Sheets-Sheet 4
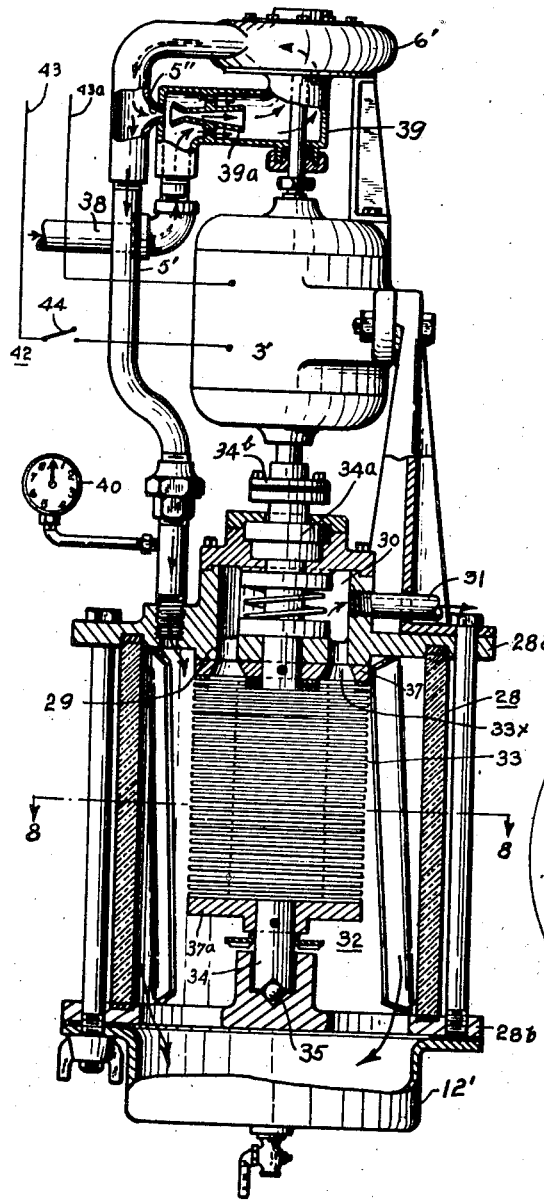
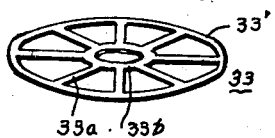
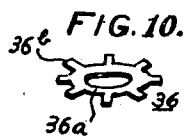
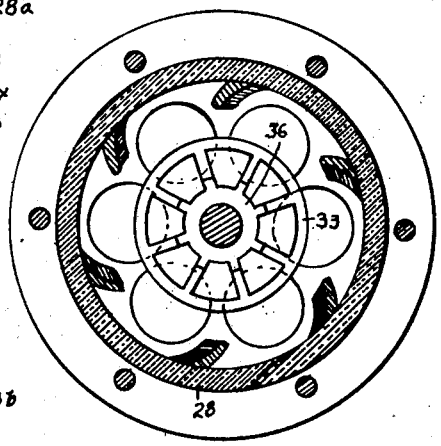
INVENTOR.
BY RUSSELL P. DUNMIRE.

Patented May 25, 1948

2,442,234

UNITED STATES PATENT OFFICE 2,442,234

PROCESS OF AND APPARATUS FOR FILTERING MATERIALS

Russell P. Dunmire, Orange, Ohio

Application May 11, 1944, Serial No. 535,062

5 Claims. (Cl. 210—64)

1

This invention relates to the process of and apparatus for separating or filtering fluids in the gaseous or liquid phase and/or solids in a semi-liquid state, such materials including (a) cutting, lubricating and fuel oils, waste oils from motor crank cases, varnishes, lacquers, paint, edible oils, acids, colloids and water; (b) liquid solutions employed in carrying out various processes, (c) coolants for machinery employed in grinding and/or cutting or shaping materials and (d) various other liquids from which it is desired to remove various suspensoids or where it is desirable to separate miscible liquids one from another.

It may also be utilized to separate solid materials entrained in gaseous fluids, dust from air or ash from gases and where it is desired to separate liquid particles from gaseous fluids, such as water from steam, and condensed fluid particles from a gas such as oil and solid materials from gasolene.

Likewise, the apparatus may be employed for separating solid materials from liquids, where it is desirable to collect the solid materials, irrespective of the immediate or ultimate use, if any, of the resulting liquid.

The apparatus may also be employed to filter a fluid containing micro-sized solids and liquid contaminants which are to be separated out and which have so small a mass as to be unaffected by a centrifugal force normally used or applied by means of a standard centrifuge. In apparatus heretofore employed for filtering fluids containing micro-sized solids and/or liquids, of which I have knowledge, the speed of filtration was very slow due to the clogging of the filter pores or capillaries in the filter media or wall, in view of which it is apparent that the surface of the filter media or wall must be maintained completely clear of a deposit (solids, slimes or other material) to insure speed of filtration.

By reason of the fact that the apparatus is capable of operating on various kinds of materials the terms "filtering" and "separating" are used in their broader sense.

One object of the invention is to provide an improved process of separating or filtering materials wherein centrifugal force effective in a direction opposed to the flow of the supplied material is utilized to separate out portions thereof.

Another object of the invention is to provide an improved process for separating from a fluid micro particles, whether consisting of solids or immiscible liquids and effecting agglomeration or coagulation thereof into masses capable of gravitating.

2

Another object of the invention is to provide an improved filtering apparatus to which material is continuously supplied, constructed to automatically maintain the filtering means of the apparatus substantially free of the heavier and/or solid portions of the supplied material, whereby speed and efficient operation result.

Another object of the invention is to provide an improved apparatus of this character the construction and operation of which prevent the accumulation on the filtering wall of the heavy, waste or solid ingredients in the material supplied to the apparatus, whereby clogging of the openings or pores in this wall is eliminated.

Another object of the invention is to provide an improved filtering apparatus, to which the material to be filtered is supplied under pressure, having means for establishing or generating adjacent to the zone wherein filtering takes place, forces in opposition to the pressure of the supplied material, effective to displace from the filtering zone the heavier and/or solid portions of the material, whereby the filtering operation may be carried on continuously, rapidly and efficiently.

Another object of the invention is to provide an improved filtering apparatus having a driven annular filtering wall which establishes a centrifugal force in opposition to the flow of the material and acts on the heavy, waste or solid portions of the material to prevent clogging of the wall or accumulation of such materials thereon.

Another object of the invention is to provide an improved filtering apparatus comprising an outer casing to which the material is supplied, an inner rotatable casing having an outlet, the side walls of the inner casing being formed of porous or foraminous material and means in the outer casing for preventing the rotation of the material therein.

Another object of the invention is to provide an improved filtering apparatus comprising an outer casing having at its upper end an inlet through which the material is supplied under pressure to the casing and a discharge opening in its lower end, an inner rotatable casing having an outlet, the side walls of the inner casing being formed with openings through which the liquid portions of the material flow thereinto, and means in the outer casing for directing the filtrate downwardly through the discharge opening.

Another object of the invention is to provide an improved apparatus for separating from a fluid micro organisms or particles, whether consisting of solids or immiscible liquids, and effecting agglomeration or coagulation thereof into masses which are free to gravitate.

Another object of the invention is to provide an improved filtering apparatus of simple construction and of high efficiency.

Other objects of the invention will be apparent to those skilled in the art to which my invention relates from the following description taken in connection with the accompanying drawings, wherein Fig. 1 is a view partly in elevation and partly in section of a filtering apparatus embodying my invention.

Fig. 2 is a section on the line 2—2 of Fig. 1.

Fig. 3 is a fragmentary section of parts shown in Fig. 1, enlarged.

Fig. 4 is a plan view of a deflector.

Fig. 5 is a fragmentary sectional view similar to Fig. 2 (enlarged); but a portion of Fig. 5 being on the line 5—5 of Fig. 6.

Fig. 6 is a fragmentary section on the line 6—6 of Fig. 5.

Fig. 7 is a view of a modified form of construction, partly in section and partly in elevation.

Fig. 8 is a section on the line 8—8 of Fig. 7.

Figs. 9 and 10 are perspective views of certain parts.

Each of my embodiments of the inventions disclosed herein comprehends an apparatus of the centrifugal type, but wherein the flow of the fluid to be filtered and its application to the filtering means are in opposition to the centrifugal force set up or established by an annulus carried by or forming part of the rotating member of the apparatus, this annulus being constructed to permit flow of the filtrate therethrough to the interior of the rotating member for circulation to a discharge or outlet leading from the apparatus.

In one embodiment, the annulus consists of a wall formed with through openings as later set forth; in the other embodiment the annulus consists of spaced fixedly related rings, as later set forth.

In the drawings, 1 indicates as an entirety an outer casing to which the material to be filtered is delivered. 2 indicates as an entirety filtering or separating means within the casing 1 and driven by a suitable motor 3, preferably mounted on the casing 1 by means of a bracket 3a, in connected relation to the filtering or separating means to illustrate one form of driving means for the latter.

In the form of construction shown in Figs. 1 to 6, inclusive, the filtering or separating means consist of a casing 2' having an annular wall 2x which is formed of porous or foraminous material and through which the filtrate flows to effect filtration or separation of the supplied material, this wall being rotated about its axis by the motor 3 (as hereinafter set forth) to establish outwardly thereof a centrifugal force effective to act on those portions of the material that are to be separated therefrom.

By preference, the filtering wall forms the side wall of the casing 2', which is bodily rotated by the motor 3.

As already set forth, the apparatus is adapted to operate on a wide range of materials. Accordingly, the size of the openings in the filtering wall will depend upon the kind or character of material to be filtered, its pressure and the speed of rotation of this wall; also, where the material to be filtered consists of a liquid, the speed of rotation of the filtering wall and the size of the openings therein will depend upon both the viscosity and pressure of the liquid.

The outer casing 1 consists of upper and lower heads 1a, 1b, formed with annular seats for an annular wall 1' and secured together and to the wall 1' by bolts 1c. The opposite ends of the wall 1' engage suitable gaskets 1e provided in the seats, whereby the casing 1 is made liquid tight. Either head or both heads 1a, 1b, may be provided with suitable instrumentalities (not shown), whereby the apparatus may be mounted on a suitable support or frame of a machine depending on the specific application of the apparatus. In the form of construction disclosed the wall 1' is formed of transparent material, such as glass. The head 1a is formed with an inlet 1a', the walls of which are preferably provided with screw threads to receive and mount a nipple 4, removably connected by a coupling 4a to a supply pipe 5, through which the material to be filtered or operated upon is supplied under pressure. In the preferred form of construction, the pipe 5 is connected to the outlet end of a suitable rotary pump 6 supported on brackets 6a which are secured to the casing of the motor 3, the rotor of the pump 6 being drivingly connected to the shaft of the motor 3, whereby one motor is utilized to drive both the inner casing 2' and pump 6. The material to be operated upon is supplied under pressure by gravity or otherwise by a pipe 7 suitably connected to the inlet end or side of the pump 6. The pump 6 being disposed in close relation to the outer casing 1, it insures delivery of the material through the inlet 1a' into the casing 1 at adequate pressure to insure flow of the filtered material into the casing 2', whereas the casing 2' is rotated, the effect of which is to establish outwardly thereof a centrifugal force which acts on the heavy and/or solid portions of the supplied material in opposition to the pressure thereof to prevent accumulation of such portions on the filtering wall of the casing 2'. Accordingly, it is advantageous to provide a pump in close relation to the inlet for the casing 1 to insure a uniform supply of the material at the proper pressure thereto. The head 1a is provided with an annular upwardly extending collar 8 on which is removably mounted a cap 9 to form a chamber 10, the side wall of the collar being formed with a screw threaded outlet opening to which a discharge pipe 11 (later referred to) is connected. The lower head 1b is formed with one or more openings 1b' (six openings 1b' in annular arrangement being shown) through which that portion of the material, which is prevented from filtering through and into the inner casing 2', gravitates or is directed, as later set forth, into a collector 12, removably related to the head 1b. By preference, the collector 12 is provided with a flange 12a formed with openings, so that certain of the bolts 1c may be extended through the head 1b and flange 12a and engaged by wing nuts 1c' for removably supporting the collector on the head 1b. As shown, a gasket 12b is provided between the flange 12a and head 1b to prevent leakage from the casing 1. The bottom wall of the collector 12 is provided with a valved drain opening, whereby any liquid material therein may be discharged from time to time.

The casing 2' comprises the following: 2a indicates a hollow shaft mounted axially of the casing 1 and preferably closed at its lower end by a threaded plug 13. The shaft 2a is hollow, whereby it may be utilized as the conduit for the filtrate from the inner side of the wall 2x to the discharge pipe. The lower end of the shaft 2a loosely fits an upstanding collar or boss 13a provided on the inner face of the head 1b. The head 1b and outer face of the plug 13 are formed with related recesses in which is mounted a ball 14 to provide an anti-friction and thrust bearing for the shaft 2a. The upper end of the shaft 2a extends through alined openings formed in the head 1a and cap 9 for connection by means of a suitable coupling 15 with the shaft of the motor 3. A gasket 15a is interposed between the parts of the coupling 15 to prevent the escape of the filtrate from the shaft 2a. The casing 1 is provided with a bearing for the upper end of the shaft 2a. In the arrangement illustrated the upper end of the cap 9 is recessed as shown at 9a to accommodate anti-friction bearings 16 between it and the shaft 2a, the bearing 16 being secured in position by an annular ring 17, removably bolted to the cap 9. 18, 18a, indicate spaced upper and lower heads each having a hollow boss 18b, fitting the shaft 2a and removably secured thereto by a set screw 18c. The inner faces of the heads 18, 18a, adjacent their peripheries, are formed with alined recesses 19 which form seats for the opposite ends of the porous or foraminous wall 2x. It will be understood that the wall 2x may be of any desired thickness and the openings therethrough may be of varying sizes for reasons already set forth. Where a porous wall is employed, it may be formed of carborundum, carbon, compressed powdered metal or artificial stone. The seats 19 are preferably annular and the wall 2x is preferably formed of a single section of material shaped in cross section to removably fit the seats 19, whereby the casing 2' is of true cylindrical form, but the invention is not to be limited to a wall of this cross-sectional shape, since the centrifugal force set up due to the rotation of the casing 2' will be effective where this wall is sectional or of some other shape. Suitable gaskets 21 are interposed between the opposite ends of the wall 2x and the bottoms of the seats 19 to prevent leakage of the filtrate from the casing 2'. The side walls of the shaft 2a between the heads 18, 18a, are formed with a plurality of openings 22, to permit flow of the material filtered through the wall or zone 2x into the shaft 2a. That portion of the shaft 2a extending through the chamber 10 is formed with a plurality of openings 23 (preferably elongated longitudinally of the shaft) to discharge the filtrate into the chamber 10 for discharge through the pipe 11. The side walls of the openings 23 act centrifugally on the filtrate flowing up through the shaft to increase the flow thereof into and through the pipe 11. 24 indicates a pair of plates surrounding and closely fitting the shaft 2a within the chamber 10 and engaged by a coiled expansion spring 24a which normally holds the plates in engagement with the bottom wall of the chamber 10 and inner face of the cap 9. 25 indicates a suitable seal mounted in an annular recess formed in the lower side or face of the head 1a and having a spring operated sealing element engaging the shaft 2a to prevent the escape of material in the casing 1, due to pressure or capillary attraction, into the chamber 10. 26 indicates a suitable seal mounted in an annular recess formed in the cap 9 below the bearing 16 and having a spring operated sealing element engaging the shaft 2a to prevent the escape of material in the chamber 10 into the bearing and outwardly therethrough.

To divert the material in the casing 1 away from the bearing 14 and seal 25, I provide on the shaft 2a adjacent each of these parts a plurality or set of outwardly extending arms or wings 2x', the revolution of which by the shaft imparts movement to the material outwardly. In the form of construction shown the arms or wings 2x' of each set consists of ridges embossed on a metal disc 2x'' (see Fig. 4) which is provided with a collar secured to the shaft 2a in any desired manner.

27 indicates a plurality of deflectors within the casing 1 and uniformly spaced therearound and preferably formed integrally with the wall 1'. The deflectors 27 are preferably curvilinear in cross section and extend inwardly relative to the wall 1' in opposed relation to the direction of rotation of the casing 2' (see arrows x in Figs. 2, 5 and 6) and are disposed from end to end of the wall 1' at an angle slightly inclined to its axis (see Figs. 1 and 6). The deflectors 27 on the wall 1' serve as barriers (a) which prevent rotative movement of the material (or portions thereof) supplied to the casing 1 due to frictional contact of the casing 2' therewith and (b) set up a turbulence or agitation in the material, whereby the heavy or solid portions thereof may be more readily separated from the fluid portion, and other results attained, as later set forth.

By positioning the deflectors 27 in opposed relation to the direction of rotation of the casing 2', they form with the wall 1' pockets in which eddy currents are set up, the effect of which is to increase the agitation of the material. By preventing rotation of the material in the casing 1, the outer surface of the wall 2x of the casing 2' is continuously washed by portions of the material without unduly affecting the flow of the liquid material through the wall 2x due to the pressure of the material supplied to the casing 1.

By disposing the deflectors 27 at an angle inclined to the axis of the casing 1, they serve to direct the heavy and/or solid portions of the material downwardly, whereby such portions are collected in the collector 12 for subsequent removal.

In operation, the material is supplied into the casing 1 under pressure and in contact with the filtering wall 2x, which being of a porous character, permits the liquid or fluid portion of the material to flow therethrough into the casing 1' from which it flows through the shaft 2a to the chamber 10 for discharge through the pipe 11. Due to the revolution of the wall 2x a centrifugal force or zone is established on its outer surface and in the liquid or fluid material adjacent thereto, which force acts on the heavy and/or solid portions of the supplied material to impart an outward movement thereof away from the wall 2x and hence prevents such portions from accumulating or being deposited on this wall. As there is a continuous supply of the material to the casing 1 and a continuous centrifugal force imparted to the heavy or solid portions thereof, the latter are forced outwardly and then downwardly into the collector 12 due to the angular arangement of the deflectors 27. Accordingly, it will be observed that the filtering wall 2x is automatically maintained free of those portions of the material which would clog or tend to clog the pores thereof, so that the supplied material is rapidly and efficiently filtered. It will be observed that the rate of flow or pressure of the supplied material must be regulated or the speed of the casing 2' be regulated so that the centrifugal force established will not prevent the inflow of material into the casing 2', but will operate effectively upon the heavier and/or solid portions of the material without unduly affecting the flow of the filtrate into casing 2'. In other words, the speed of the casing 2' must be related to or balanced against the pressure of the supplied material. Where the material to be filtered is a liquid, this speed and pressure must be regulated with respect to the viscosity of the material, to insure flow of the liquid or fluid at a predetermined rate and rapid and efficient operation. As shown, the motor 3 is directly coupled to the shaft 2a and pump 6, so that the latter is designed for a predetermined capacity in relation to the speed of the casing 2' and viscosity of the material to be supplied to the casing 1. It will be obvious that a suitable speed change mechanism may be interposed between the motor 3 and shaft 2a or between the motor 3 and pump 6 to meet varying conditions, dependent upon the kind and/or viscosity of the material to be operated upon; or a variable speed motor may be employed and the pump 6 driven by a separate motor.

It will be observed that the type, character or construction of the wall 2x will depend upon the kind of material to be filtered and/or the character or size of the heavy particles or bodies therein. For example, this wall may consist of sheet metal formed with openings of any desired size, wire mesh of any desired screen capacity per square inch or spaced annular rings, as later set forth.

On the other hand, the wall 2x may be adapted to separate out the heavier portions of immiscible liquids. In employing a liquid of this character the macro solids or particles are progressively forced outwardly and caused to unite or agglomerate with other particles into larger sizes or masses as shown at x' (see Fig. 5) and these masses may in turn unite or agglomerate with other particles and/or masses as shown at x", whereby bodies of solid materials capable of gravitating result. As these masses are acted upon by the centrifugal force developed by the casing 2', they are continuously forced outwardly away from the wall 2x and accumulate against the wall 1'. Where the fluid to be filtered contains micro organisms or particles in the solid and/or liquid phase, they are caused to agglomerate progressively by action of the centrifugal force until the combined agglomerated organisms or particles build up into masses having a size capable of being further acted upon by the centrifugal force and are thereby forced beyond the influence thereof and free to precipitate due to the action of gravity, whereby they settle into the collection chamber 12. Due to the fact that the casing 1 is maintained filled with the material to be filtered and a centrifugal force is established by the rotating casing 2', these masses are continuously formed and progressively forced outwardly and the previously formed masses are forced beyond the influence of the centrifugal force, whereby these masses are free to precipitate under the influence of gravity. As these masses are continuously formed, the previously formed masses are forced by the succeeding masses outwardly or radially into engagement with the inclined deflectors 27, which co-act with the outward movement of the masses to direct them downwardly into the collector 12.

In the embodiment shown in Figs. 7, 8, 9 and 10, the outer casing, indicated as an entirety at 28, is similar in construction to the casing 1 shown in Figs. 1 and 2, except that the upper head 28a thereof is formed with a plurality of openings 29 (two only being shown) through which the filtrate flows to a chamber 30 for discharge through the pipe 31. The lower head 28b of the casing 28 supports a collector 12' which is similar to the collector shown in Fig. 1.

The filtering or separating means, indicated as an entirety at 32, comprises a rotating member consisting of a plurality of spaced, fixedly related rings 33, surrounding and fixedly connected to a shaft 34, which being driven (as later set forth) rotates the rings 33 to establish a centrifugal force outwardly thereof. The shaft 34 is mounted at its lower end in a thrust bearing 35 provided on the lower head 28b of the casing 28. The upper end portion of the shaft extends through the upper head 28a and the chamber 30 and is mounted in suitable anti-friction bearings 34a. The upper end of the shaft 34 is connected through a suitable coupling 34b to the shaft of a motor 3', which is preferably mounted on the casing 28 similarly to the mounting of the motor 3. By preference, the motor 3' operates a pump 6' which supplies the material to be filtered through a pipe 5' to the casing 28. Each ring 33 is integrally connected to radial, inwardly extending arms 33a, the inner ends of which are integrally connected to a collar 33b fitting the shaft 34, these parts being preferably stamped out of sheet stock. 36 indicates spacers (preferably stamped out of sheet stock) interposed between the collars 33b, and serving as the means for spacing the rings 33, to form therebetween in-flow openings for the filtrate. Each spacer 36 consists of an annulus 36a fitting the shaft 34 and provided with outwardly extending radial lugs 36b, one for each arm 33a of adjacent rings 33 and alined therewith to reinforce them. As will be observed the collars 33b and spacers 36 are assembled face to face on the shaft 34 and may be secured thereto, but by preference they are rigidly held in assembled relation between a pair of plates 37, 37a, which are pinned or otherwise secured to the shaft 34. It will also be observed that the rings 33 and spacers 36 may be of any desired thickness and/or the thickness of the rings 33 may vary with respect to that of the spacers 36. The spacers may have a thickness of two ten thousandths of an inch, but may be varied dependent upon the kind of material supplied to the casing 28.

In assembling the rings 33 on the shaft 34, the openings 33' formed by the arms 33a and collars 33b are alined and serve as conduits for the filtrate in registry with openings 33x formed in the plate 37, the latter openings being arranged to register with the openings 29, as the member 32 rotates, to permit flow of the filtrate to the chamber 30 and discharge therefrom through pipe 31.

The pump for supplying the material to the outer casing of the apparatus may be provided with suitable priming means such as shown in Fig. 7. In this arrangement the supply pipe 38 which leads to the intake of the pump 6', is provided with a casing 39. A venturi 39a is mounted in the casing 39 with its in-take end related to a port 5" formed in the pipe 5', so that when the pump 6' is initially driven the stream of air from the port 5" flowing through the venturi will induce flow of the material supplied by the pipe 38.

Under some circumstances it may be desirable to filter material without rotating the casing 2

(Fig. 1) or member 32 (Fig. 7). In this manner of operation the supply of material is continued, for example, due to gravitational flow thereof, until the openings in the filtering wall 2x (Fig. 1) or between the rings 33 (Fig. 7) become totally or partially clogged by the heavier or solid portions of the material and to then, for a period of time, operate the motor to rotate the casing or member, the centrifugal force thereby established serving to remove from the wall 2x or rings 33 such portions of the material that adhered thereto. 40 indicates a pressure gage suitably connected to the nipple 4. 44 indicates a switch for closing the motor circuit.

To those skilled in the art to which my invention relates, many changes in construction and widely differing embodiments and applications of the invention will suggest themselves without departing from the spirit and scope of the invention. My disclosures and the description herein are purely illustrative and are not intended to be in any sense limiting.

What I claim is:

1. In a filtering apparatus, the combination of a substantially liquid tight casing consisting of upper and lower end walls and a side wall, a separate casing mounted within said first mentioned casing to rotate about a vertical axis and provided with a porous side wall through which the material is filtered, outlet connections for the filtrate leading from the interior of said separate casing through one of said end walls, means for supplying material under pressure into said first mentioned casing, means for rotating said separate casing, the lower end wall of said first mentioned casing being formed with an opening through which the heavy particles of the material are discharged, and deflectors on and extending substantially longitudinally of the inner wall of said first mentioned casing for directing the heavy particles downwardly to said discharge opening.

2. An apparatus as claimed in claim 1 wherein said deflectors are inclined to the axis of said first mentioned casing.

3. In a filtering apparatus, the combination of a casing having an annular side wall and top and bottom end walls, an inlet extending through said top end wall, a separate casing within said first mentioned casing and consisting of top and bottom end walls and an annular side wall concentrically related to the side wall of said first mentioned casing and formed of porous material arranged to provide an annular space between it and the side wall of said first mentioned casing, a hollow shaft fixedly related to said separate casing and extending therethrough and the top end wall of said first mentioned casing and rotatably supported in bearings in the top and bottom end walls of said first mentioned casing, a discharge chamber carried by the top end wall of said first mentioned casing, said shaft within said separate casing being formed with openings to receive the material filtering through said porous wall and above the top wall of said first mentioned casing being formed with outlet openings for the discharge of the filtered material into said chamber, means for supplying through said inlet to said first mentioned casing material under pressure, means for rotating said shaft and separate casing to establish a centrifugal force outwardly of said porous side wall to prevent accumulation thereon of the heavier portions of the material, and a discharge conduit leading from said chamber, the bottom end wall of said first mentioned casing being formed with an opening through which the heavier portions of the material are discharged.

4. In apparatus of the class described, the combination of a casing consisting of upper and lower end walls and an annular side wall, said lower end wall being formed with a discharge opening, means for supplying into the upper end of said casing fluid under pressure to be filtered, an outlet leading from said casing, filtering means within said casing, said filtering means including a member mounted to rotate in bearings provided in said upper and lower end walls and having a porous side wall through which the filtrate flows to said outlet, power means for rotating said member to establish outwardly thereof a centrifugal influence arranged to force the heavier portions of the fluid away from said member and prevent clogging of said side wall, and spaced elements on the inner side of the side wall of said casing and extending longitudinally thereof for guiding the heavier portions of the material to said discharge opening.

5. The herein disclosed process of agglomerating and filtering particles in a mixture thereof with a fluid, which comprises continuously supplying the mixture under pressure to a casing for flow therethrough in opposition to a centrifugal force established by a rotating porous wall in said casing and simultaneously retarding the mixture as it contacts the rotating porous wall, whereby rotation of the mixture is retarded, filtering of the fluid through the wall and agglomeration of the particles are obtained, and continuously discharging the filtrate and collecting the agglomerated particles.

RUSSELL P. DUNMIRE.

REFERENCES CITED

The following references are of record in the file of this patent:

UNITED STATES PATENTS

| Number | Name | Date |
|---|---|---|
| 978,450 | Homans | Dec. 13, 1910 |
| 1,262,146 | Ward | Apr. 9, 1918 |
| 1,641,485 | Heftler | Sept. 6, 1927 |
| 1,933,548 | Finney | Nov. 7, 1933 |
| 2,091,536 | Van Impe | Aug. 31, 1937 |

FOREIGN PATENTS

| Number | Country | Date |
|---|---|---|
| 2,420 | Great Britain | 1912 |
| 298,226 | Great Britain | Dec. 27, 1928 |